June 24, 1930.  H. A. WINTERMUTE ET AL  1,766,422
METHOD AND APPARATUS FOR ELECTRICAL PRECIPITATION
Filed Nov. 28, 1927  4 Sheets-Sheet 1
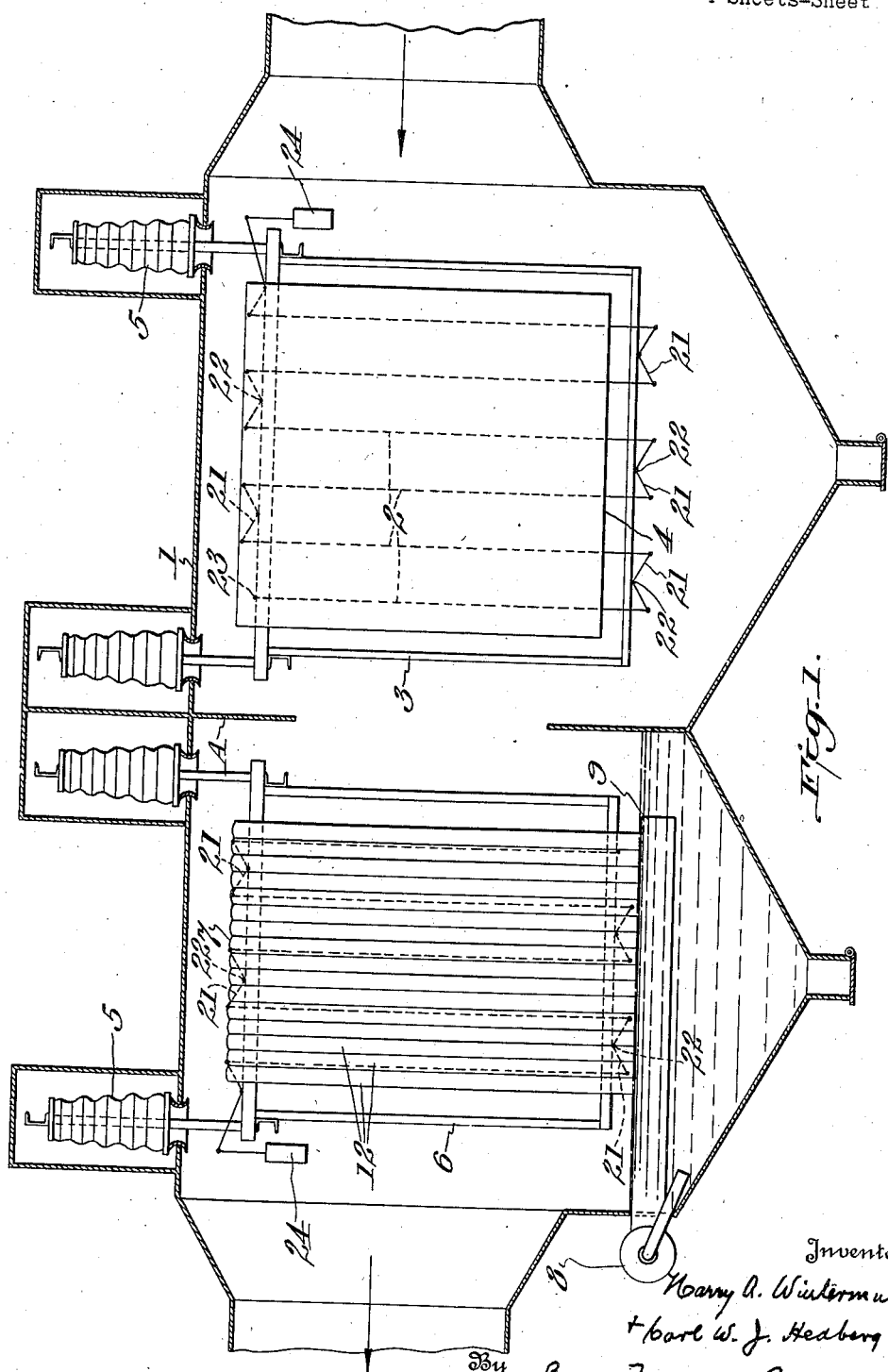

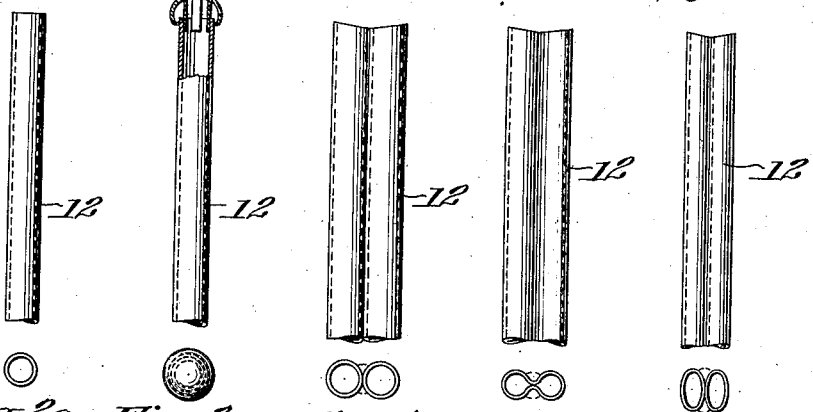
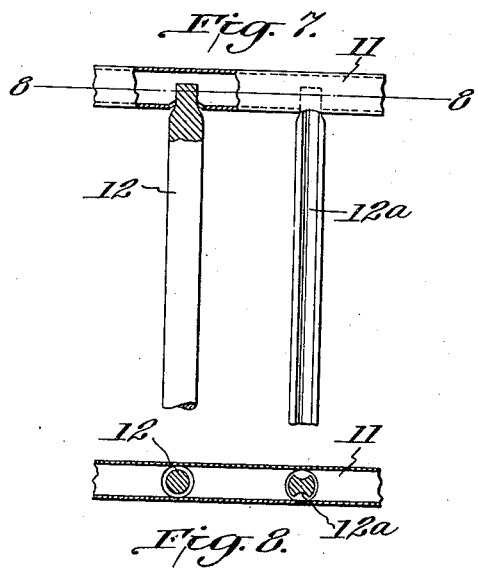
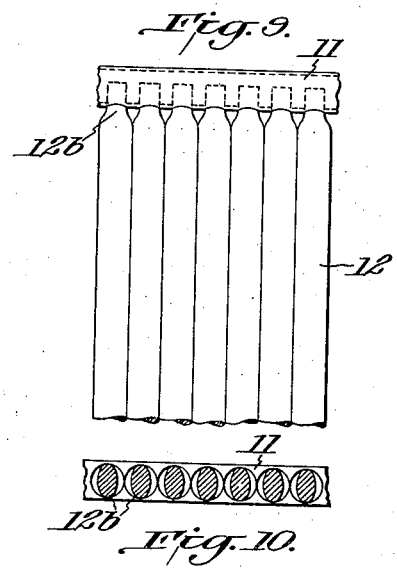

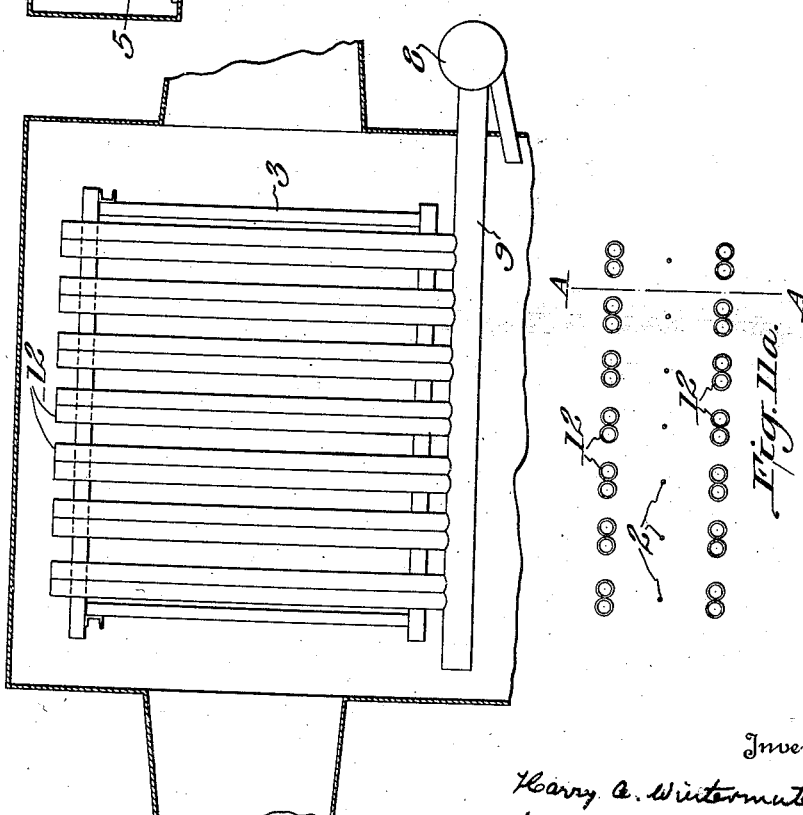

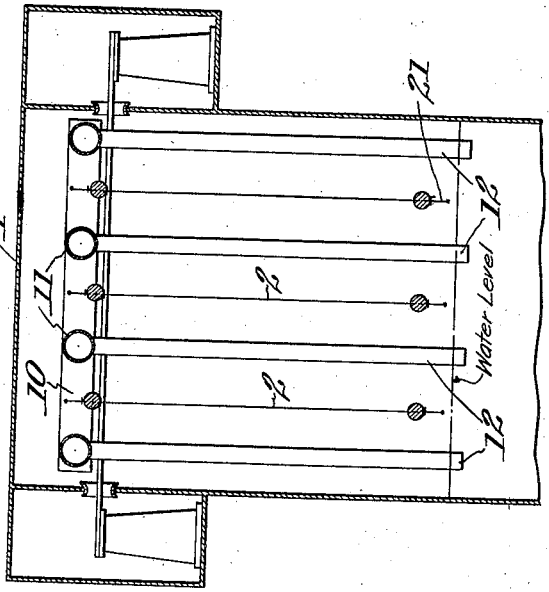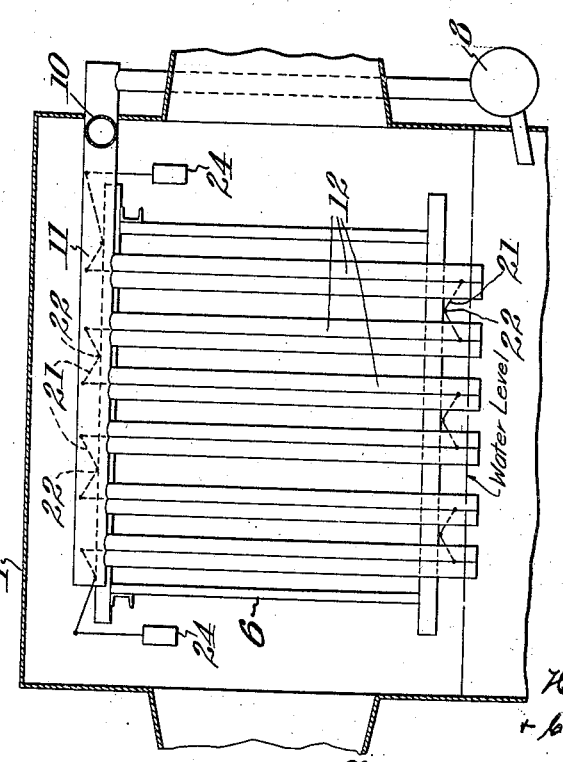

Patented June 24, 1930

1,766,422

UNITED STATES PATENT OFFICE

HARRY A. WINTERMUTE, OF PLAINFIELD, AND CARL W. J. HEDBERG, OF MIDDLESEX BOROUGH, NEW JERSEY, ASSIGNORS TO RESEARCH CORPORATION, OF NEW YORK, N. Y., A CORPORATION OF NEW YORK

METHOD AND APPARATUS FOR ELECTRICAL PRECIPITATION

Application filed November 28, 1927. Serial No. 236,335.

This invention relates to the art of electrically precipitating suspended particles from gases, and while applicable to a number of dust cleaning problems, is primarily adapted for the removal of ash and other suspended matter from the gaseous products of combustion from boilers fired with powdered fuel. This problem involves the separation of large quantities of refuse material from great volumes of gas which vary widely in amount due to fluctuations in power loads. As much as possible is collected in a dry state to facilitate handling and removal. Furthermore it is desirable to maintain gas temperatures in order to provide sufficient stack draft and thereby reduce fan operating costs. This type of gas, moreover, may contain a certain percentage of sulfurous gases, so that the use of water in cleaning these gases must be controlled to minimize corrosion of metal parts of the apparatus.

In the use of electrical precipitators for steam plants of the kind described it has been found that there is a certain critical velocity above which effective precipitation falls off very rapidly, due largely to the presence in the combustion gases of grit and unconsumed coal which are not retained at the collecting electrode, as commonly used, but travel along its surface. This content of grit and combustible matter, as well as the volume of the gas, increases at peak loads, and the electrical precipitators must be designed to take care of the maximum or peak load conditions.

In order to take care of these conditions, we subject the gases first to the action of electrical precipitation conditions in the absence of flushing liquid, and then subject the gases from which the more finely divided particles have been removed, to further electrical precipitating conditions, including the use of liquid flushed collecting electrodes to thereby recover whatever suspended matter has escaped collection at the surface of the dry collecting electrodes. We contemplate the use of water as a flushing liquid, although it will be obvious that other flushing liquids may be used.

We are aware that it is not new to flush the surfaces of the collecting electrodes with water (see Burns Patent No. 1,250,088, Dec. 11, 1917), but under these conditions a sludge of water and precipitated material is formed, which is troublesome to handle. We have found that this sludge is caused principally by the mixture of water and the very fine suspended particles of the gas, whereas, in a mixture of water and coarser particles, no sludge is formed, the precipitated matter settling to the bottom of the container. According to our invention the bulk of the fine material is eliminated in a "dry" precipitator and the residual usually coarser material is collected in a "wet" precipitator, so arranged that the difficulties above referred to are minimized.

While various types of flushed collecting electrodes may be used, we have found it preferable to use novel collecting electrodes of the kind hereinafter described, whereby many of the disadvantages of "wet" precipitators are obviated.

Due to the necessary use of pipes for conducting the flushing liquid to the "wet" collecting electrodes, the usual system of suspension of the discharge electrodes is not well adapted to the above-described structure and as part of this invention we have devised a novel supporting system for these electrodes which we have more particularly described and claimed in our copending application Serial No. 359,684. Although this system is particularly well adapted for use with a "wet" precipitator, it will be understood that it is not limited to use with a "wet" unit, but may be advantageously applied to any form of "dry" or "wet" unit. In this type of suspension, cleaning of the discharge electrodes is facilitated.

The invention will be understood from the accompanying drawings in which:

Fig. 1 is a diagrammatic elevation of an electrical precipitation system having both "dry" and "wet" sections;

Figs. 2 to 6 are illustrations of various forms of collecting electrode units; and Figs. 2a to 6a show corresponding end views;

Fig. 7 shows modified forms of electrode units;

Fig. 8 is a section on plane 8—8 of Fig. 7;
Figs. 9 and 10 are elevation and cross-section of a modification;
Fig. 11 is a section through a "wet" precipitator showing general location of collecting electrodes;
Fig. 11ª is a partial horizontal section;
Fig. 12 is a sectional elevation on plane A—A of Fig. 11ª;
Figs. 13 and 14 show arrangements like Figs. 11 and 12, but having the water-feed at the top.

Referring to Fig. 1, the gases from the furnaces pass through the chamber marked 1, which is divided into a dry section and a wet section, by a partition A. The dry section may be the well known type of electrical precipitator comprising a series of discharge electrodes 2, mounted in a frame 3, supported on insulators 5, and located between collecting plate electrodes 4.

It will be noted, however, that the suspension for the discharge electrodes 2 is not of the conventional type but involves structural features which are particularly advantageous. The wires 2 are attached to rigid bell-crank members 21, said members being pivoted to the frame 3 at points 22. One end of the last electrode 2 is connected directly to the frame 3, as shown at 23, while one end of the first electrode is connected to a bell-crank supporting a weight 24. By this construction it will be seen that wire electrodes 2 are held taut by the weight 24.

In this section the bulk of the finely divided suspended material is precipitated from the hot gases and drops down into a hopper.

The hot gases then pass into the wet section, which has discharge electrodes mounted on the frame 6 and located between collecting electrodes 7, which may be of any suitable type such as flat or corrugated plates, but are here shown as made up of units 12, to be later described. These collecting electrodes are flushed with water, or other suitable liquid by means of a pump 8 which delivers the liquid from the bottom of the section to a header 9, to which are connected the hollow units of the collecting electrode, the liquid passing upward through these hollow units, overflowing at the top, and then flowing down over the outside of the units.

The discharge electrodes of this wet section are suspended similarly to those of the dry section, this method of suspension being peculiarly advantageous in a wet section. As seen in Fig. 1, it is necessary for the main feed pipes 9, at the bottom, to be much larger than the vertical pipes 7 which form the collecting electrodes. If the water level is below these main feed pipes, it means that the discharge electrode wires must pass these pipes much closer than the normal gap between the discharge electrodes and the streams of water, which would, of course, result in heavy discharges at these points. By the construction as shown, the water level is above the main feed pipe 9, and lever arms 21 project toward the water level but properly spaced therefrom to avoid excessive arcing. An even tension is thus placed on all the discharge wires.

Another advantage particularly useful with a wet section is that corona discharge will take place from the sharp points at the bottom of the lever arms to the surface of the water, thus giving an effective precipitation along the water level. Leakage of the gas along the surface of the water is thus eliminated and a high gas velocity may be maintained here also.

Another advantage of the lever-arm suspension of discharge wires, whether applied to wet or dry sections, is that the wires are prevented from swaying. When each discharge electrode is weighted it is necessary that each weight be very thin and wide, and these weights sway and twist due to the gas velocity and permit excessive arcing to the collecting electrodes.

The collecting units 12 may take a variety of forms, such as are shown in Figs. 2–6.

In Figs. 2 and 2ª, the unit is a hollow pipe.
In Fig. 3, the pipe is provided with a cap for better water distribution over the pipe.
In Fig. 4, two pipes are arranged side by side with their tops inclined so that the water will flow down the valley or groove between the pipes, as indicated. Fig. 5 shows a special shape of pipe giving the same result as in Fig 4. Fig. 6 is like Fig. 4 except that the pipes are elliptical in cross-section. These units may be made of any suitable material, such as metal, concrete or earthenware; and they may be arranged either side by side, as shown at 7 in Fig. 1, or spaced apart as shown in Figs. 7, 11 and 13. The collecting electrodes, formed in any of the manners described, are located in the chamber through which flows the gas stream. By the arrangements shown, the water is localized in streams so that the temperature of the gas is not materially lowered, nor is its humidity increased to such an extent that condensed water is deposited in the outlet flues.

The grit, ash, or agglomerated material will be driven by the electrical discharge from the discharge electrodes towards or against the collecting electrode, and will be washed down by the stream of water into the receptacle at the bottom, where it readily settles, thus permitting the water to be recirculated.

Fig. 11 shows in longitudinal elevation the wet section of an electrical precipitator in which the collecting electrodes are formed of units such as are shown in Fig. 4; and Fig.

12 shows in sectional elevation a similar arrangement showing the relative positions of the discharge and collecting electrode systems. While electrodes similar to Fig. 4 are shown, many other types may be used of which Figs. 2, 3, 5 and 6 are examples.

Instead of delivering the water from below upwardly through the collecting electrode units, water may be poured from above over the outer surface of the units as shown in Figs. 13 and 14, in which water is delivered from pump 8 to a cross feeder pipe 10, from which extend pipes 11 over each collecting electrode, these pipes 11 having openings in their bottom portions into which project the upper ends of the units 12, these upper ends being of less diameter than the holes in the pipes, so that a stream of water flows down over the outside of the pipe. These ends may be either circular or shaped as shown at 12$^a$ (Fig. 8) or 12$^b$ (Fig. 10). When the units 12 are shaped as shown at 12$^a$ (Fig. 8) or 12$^b$ (Fig. 10) they may be located in close proximity, as shown in Fig. 9, and the flow of water is localized in the valley or groove between adjacent units, as is also the case in the forms shown in Figs. 4, 5 and 6. This localization of the stream has the advantage that it is not subjected to the draft of the rapidly flowing stream of gases. The discharge electrodes 2 are preferably arranged opposite these localized streams as shown in Fig. 11$^a$.

In these figures, the discharge electrodes are shown as suspended similarly to those of Fig. 1, except that a weight 24 is used at each end instead of fixing one end electrode directly to the frame.

While we have described special forms of collecting electrodes designed to produce uniformity of water flow, it is obvious that these collecting electrodes may consist of flat or corrugated plates with the water streams supplied at their tops by means of horizontal feed pipes, as shown in the Burns patent above referred to.

In operation the stream of gases carrying ash, unconsumed coal particles and the like, flows through the dry section which is made of sufficient length to collect and precipitate the bulk of the suspended material in dry condition. The partially cleaned gas still at high temperature and velocity then passes through the wet section which need be only of sufficient length to collect and precipitate the coarser material which has passed the dry section. This material is washed down from the collecting electrodes, but because of its physical character does not form a sludge, but readily settles out from the water in the collecting tank, from which it may be removed by any suitable means.

The gas is not materially cooled in passing through the wet section since only the side portions of the stream are brought into contact with the water, nor is there any objectional humidification.

The wet and dry precipitation sections may be connected to a common high tension system or each may be provided with its own source of electrical energy. The system provides additional flexibility as it may be found advantageous to operate such wet sections only at peak load periods when the gas volumes are much above the average.

By the combination described of dry and wet electrical precipitating sections in series or tandem relation, the suspended material in the gases is efficiently precipitated, while the draft conditions are not impaired. The finer particles, which would form a sludge if mixed with water, are recovered in dry condition, and the coarser ash and the like are washed down with water from which they settle without difficulty. This arrangement moreover insures effective precipitation from a gas stream moving at high velocity.

We claim:

1. The method of electrically precipitating suspended particles from a gas stream which consists in passing said stream first through a high tension electrical precipitator to precipitate and collect in dry condition a portion of the suspended material and then passing the stream through an electrical precipitator in which the collecting electrodes are provided with flushing streams of liquid to wash down the particles precipitated thereagainst.

2. Apparatus for electrical precipitation of suspended particles from gases comprising a "dry" section having discharge and collecting electrodes, and a "wet" section comprising discharge electrodes and collecting electrodes provided with means for causing liquid to flow thereover, and means for causing the stream of gas to pass through said sections in series.

3. The method of removing suspended particles from a gas stream which consists in passing said stream through a separating device adapted to separate and collect in dry condition a portion of the suspended material and then passing the stream through an electrical precipitator in which the collecting electrodes are provided with flushing streams of liquid to wash down the particles precipitated thereagainst.

4. A method of removing suspended particles from a gas stream which comprises first passing said stream through a high tension electrical precipitator to precipitate and collect that portion of the suspended particles which will stick together when the particles are brought into contact with one another on the collecting electrodes under the influence of the high voltage and thereafter collecting in a wet state that portion of the particles which will not stick together as aforesaid by causing the gas stream to impinge on surfaces having liquid flowing thereover.

In testimony whereof, we affix our signatures.

HARRY A. WINTERMUTE.
CARL W. J. HEDBERG.